United States Patent [19]
Aronov et al.

[11] 4,394,591
[45] Jul. 19, 1983

[54] LINEAR A-C GENERATOR

[76] Inventors: Sergei A. Aronov, Slavyansky bulvar, 1, kv. 396; Vladimir A. Bashilov, Prospekt Mira, 112, kv. 331, both of Moscow; Nikolai M. Volkov, Ljuberetsky raion, poselok Dzerzhinsky, ulitsa Shkolnaya, 5, kv. 187, Moskovskaya oblast; Sergei D. Dukhovlinov, Orlikov pereulok, 8, kv. 10, Moscow, all of U.S.S.R.

[21] Appl. No.: 887,534

[22] Filed: Mar. 17, 1978

[30] Foreign Application Priority Data

Aug. 18, 1977 [SU] U.S.S.R. ................. 2509409

[51] Int. Cl.³ ............................................. H02K 45/00
[52] U.S. Cl. .......................................... 310/11; 310/15
[58] Field of Search ..................... 310/14, 12, 13, 15

[56] References Cited
U.S. PATENT DOCUMENTS 3,337,760  8/1967  Allport ................... 310/13

Primary Examiner—Donovan F. Duggan
Attorney, Agent, or Firm—Lilling & Greenspan

[57] ABSTRACT

A linear a-c generator according to the present invention comprises a stationary magnetic system and n channels filled with liquid metal, each channel being partially located in the gap of the stationary magnetic system. All the channels are connected hydraulically in series and form a closed hermetically sealed loop. The channels accommodate armatures reciprocating therein. Electrodes are used for taking off the energy generated in the armatures. The invention makes it possible to improve the weight-dimensional characteristics of generators of this type and to provide for high efficiency and a long service life.

4 Claims, 4 Drawing Figures

LINEAR A-C GENERATOR

FIELD OF THE INVENTION

The present invention relates to generators with reciprocating armatures and, more particularly, to linear a-c generators.

The invention can be used in transport vehicles and in emergency power supply systems.

BACKGROUND OF THE INVENTION

In reciprocating generators, an electromotive force is induced in an armature oscillating in a transverse magnetic field of a stationary magnetic system.

In order to obtain generators of this type having small overall dimensions and weight, it is necessary to provide for oscillation of the armature at a high frequency (at least 50 Hz), which, in turn, makes it necessary to reduce the armature weight. In this case, the conditions of cooling the armature are deteriorated due to an increase in the current density. High efficiency can be obtained only when the effect of the dissipative forces is insignificant. For most applications, the generators must have an operating life of about $10^3$ hours.

All these problems are essentially solved by using the present invention.

DESCRIPTION OF THE PRIOR ART

Known in the art is a linear generator (Novel Alternating Current Generators, by J. M. Jenkins, Elektro-Anzeiger, Essen, No. 22-24, p. 486-8, 1965), in which the armature is made in the form of a short-circuited aluminum ring whose opposite parts are arranged in the gaps of a stationary magnetic system, while the ring itself embraces the core of a power take-off transformer serving as a primary winding thereof.

Such a generator has satisfactory parameters, but the time of its continuous operation cannot be very long, since the necessity to reduce the weight of the armature calls for an increased current density therein and results in its overheating because the employed air cooling system cannot provide normal temperature conditions for the operation of this armature.

Also known in the art is a linear generator (U.S.S.R. Inventor's Certificate No. 535,678), in which the armature is made in the form of a plate made of an electrically conductive material and placed in a hermetically sealed channel filled with liquid metal. The end sections of the channel are closed with bellows whose inner end surfaces are rigidly connected to the armature, the outer surfaces being connected to a drive mechanism. The load is connected to electrodes which are in contact with the liquid metal.

In this generator, the liquid metal provides for effective cooling of the armature having a small weight, i.e., with a high current density in the armature. However, the oscillation of the armature in a rectilinear hermetically sealed channel is associated with considerable hydraulic and electrical losses due to the motion of the liquid metal in the gap between the armature and the channel walls in a direction opposite to the motion of the armature. This does not allow adequate efficiency to be obtained.

The unbalance associated with the movement of the center of masses is a common disadvantage of both above-mentioned generators.

SUMMARY OF THE INVENTION

It is an object of the present invention to attain improved specific weight-dimensional characteristics while maintaining high efficiency and a long operational life and eliminating the vibration caused by the unbalance.

The invention resides in a linear a-c generator comprising a stationary magnetic system, a hermetically sealed channel partially located in the gap of said system and filled with liquid metal, in which there is placed an armature adapted to reciprocate and electrodes for taking off the energy generated in said armature. According to the invention, there are provided n additional channels filled with liquid metal and with armatures placed therein, all the channels being connected hydraulically in series and forming a closed hermetically sealed hydraulic loop.

It is expedient that the electrodes and channels filled with liquid metal be electrically short-circuited and form a primary winding of the power take-off transformer, a part of the transformer core being aligned with the magnetic circuit of the stationary magnetic system.

It is preferable that the sections of the channels enclosing the armatures be arranged so that they form faces of a rectangular prism having a base in the form of a regular polygon.

BRIEF DESCRIPTION OF THE DRAWINGS

The above and other objects and advantages of the invention will be apparent from consideration of specific embodiments thereof with reference to the accompanying drawings, in which.

DETAILED DESCRIPTION OF THE INVENTION

Figure 1:
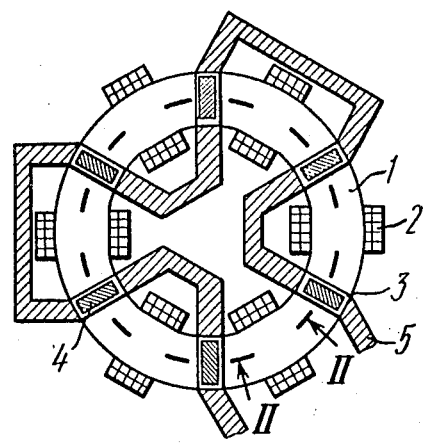
FIG. 1 shows a linear a-c generator according to the invention.

The generator includes a stationary magnetic system comprising a magnetic circuit 1 (FIG. 1) and field windings 2, and channels 3 filled with liquid metal and accommodating armatures 4. The sections of the channels 3, in which the armatures 4 are located, are partially arranged in the gaps of the magnetic circuit 1 so that their axes are coincident with the direction of motion of the armatures 4 and parallel to each other.

The generator also includes electrodes 5 connecting the channels electrically in series and intended for connecting a load (not shown).

The armatures 4 consist of plates made of a material having a high electrical conductivity and a low specific gravity, e.g., of aluminum, and are separated by insulating spacers 6 (FIG. 2) in a direction transverse to the direction of motion. The spacers 6 reduce the longitudinal currents caused by the reaction of the armature 4.

Rods 7 extending through packing glands 8 arranged in the covers 9 of the channels 3 are used for connecting the armatures 4 to a prime mover (not shown), e.g., a free-piston internal combustion engine. The walls 10 of the channels 3 are made essentially of an electrically insulating material.

Figure 3:
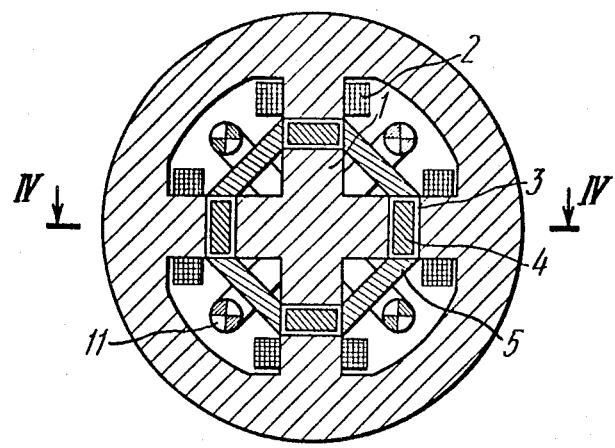
FIG. 3 shows a linear generator in which the electrodes and channels are electrically short-circuited, according to the invention.
Figure 4:
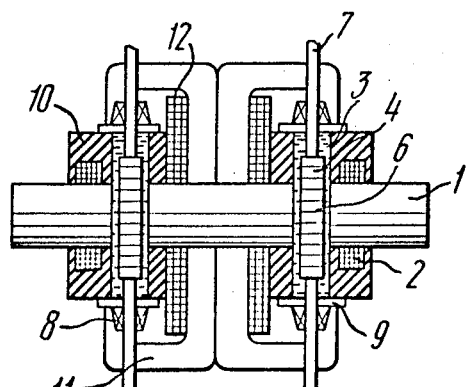
FIG. 4 is a sectional view taken along the line IV—IV of FIG. 3.

FIG. 3 shows an a-c generator, in which the channels 3 and electrodes 5 form a short-circuited turn serving as a primary winding of a power take-off transformer; the magnetic circuit 1 of the magnetic system has such a form that its part is coincident with a part of the core 11 of said transformer, while the channels 3 are located at the sides of a regular polygon. In this generator the load (not shown) is connected to the secondary winding 12 (FIG. 4) of the power take-off transformer.

Figure 2:
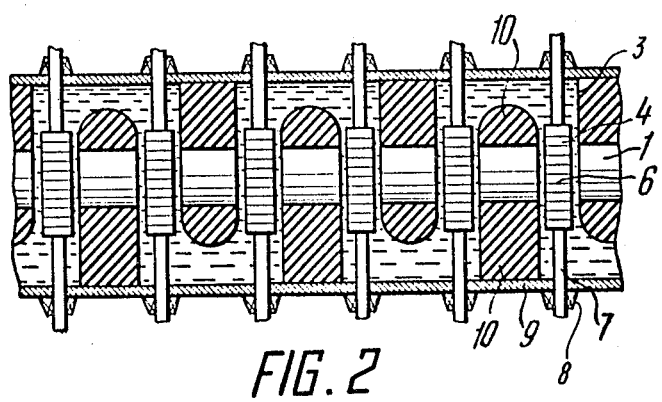
FIG. 2 is a sectional view taken along the line II—II of FIG. 1.

The generator operates as follows. The engine (not shown) causes the armatures 4 to reciprocate by means of the rods 7 (FIG. 2). In each successive channel 3, the armature 4 moves in a direction opposite to the motion of the armature 4 in the preceding channel 3. Since the channels are in a transverse magnetic field, an electromotive force is induced therein. The channels 3, in which the armatures 4 move, are electrically connected so that the generated e.m.f.s. are summed up. The liquid metal provides for electrical and thermal contact of the armatures 4 with the electrodes 5 having liquid cooling. The transverse charging of the armatures 4 is used for reducing the longitudinal currents caused by the reaction of the armature 4, which increases the generator efficiency. The channels 3 may be filled with alloys of alkali metals, for example, an eutectic alloy of sodium and potassium. The connection of the channels 3 into a closed circuit makes it possible to select the transverse size of the armature 4 close to that of the channel 3, which provides for hydraulic synchronization of motion of the armatures 4 due to the movement of the liquid metal placed between the armatures 4 and is responsible for insignificant shunting currents through the layers of liquid metal in the gap between the armatures 4 and the walls of the channels 3. When the generator is provided with an even number (greater than two) of channels 3, it is balanced since there is no movement of the center of masses, and the total moment of inertia forces with respect to this center is zero.

Owing to the fact that the e.m.f. generated in one armature 4 is low, on the order of one volt, it is expedient to make the generator with short-circuited channels 3 (FIG. 3) and a transformer output. In this embodiment of the invention, an electric current flows through the armatures 4 moving in the magnetic field due to the induced e.m.f. and, since the armatures 3 and electrodes 5 form a primary winding of a transformer, the electric energy is sent to the user at a required voltage from the secondary winding 12, which is magnetically coupled to the primary winding.

The proposed design of a linear a-c generator provides for a comparatively low value weight of the moving parts, which makes it possible to operate at frequencies about 100 Hz and to provide for improved weight-dimensional characteristics. The reduction of the hydraulic and electrical losses allow the working process in the channels 3 to be conducted with low losses, which makes it possible to increase the efficiency of the machine. Multichannel design of the generator eliminates vibration. All main components of the generator can run for a long time, thus providing for durability of the system.

What is claimed is:

1. A linear a-c generator comprising: a stationary magnetic system having a magnetic circuit; n channels filled with liquid metal, each of said n channels being partially located in a gap of said stationary magnetic system and all of said channels being connected hydraulically in series to form a closed hermetically sealed loop; armatures located in said channels and being reciprocal therein; and electrodes for taking off the energy generated in said armatures.

2. A linear a-c generator as claimed in claim 1, further comprising a power take-off transformer having a primary winding and a core, said electrodes and channels being electrically short-circuited and forming said primary winding of said power take-off transformer, a part of said core being aligned with the magnetic circuit of said stationary magnetic system.

3. A linear a-c generator as claimed in claim 1, wherein the sections of said channels housing said armatures are located so that they form faces of a rectangular prism having a base in the form of a regular polygon.

4. A linear a-c generator as claimed in claim 2, wherein the sections of said channel housing said armatures are arranged so that they form faces of a rectangular prism having a base in the form of a regular polygon.

* * * * *